Oct. 16, 1928.

E. GANSFRIED 1,687,554

LEAKAGEPROOF SPRING SECURED SAFETY VALVE

Filed May 17, 1926

Inventor,
Eugene Gansfried,
By His Attorney

Patented Oct. 16, 1928.

1,687,554

UNITED STATES PATENT OFFICE.

EUGENE GANSFRIED, OF NEW BRUNSWICK, NEW JERSEY.

LEAKAGEPROOF SPRING-SECURED SAFETY VALVE.

Application filed May 17, 1926. Serial No. 109,630.

This invention relates to improvements in gas fixtures, more particularly to gas cocks or valves wherein leakage is precluded, and is an improvement on the spring secured safety valve shown and described in an application filed by me Dec. 17, 1925, Ser. No. 75,900, patented June 1, 1926, No. 1,587,296.

In the construction of the valve shown in the above identified application, leakage may occur around the straight valve stem 15, there being no sealing or binding relation between the said stem and its enclosing sleeve 13, and further, two cross pins are required, one each at the top and bottom, of the structure.

The object of the present invention is to provide a construction whereby leakage possibility is eliminated and positive sealing action achieved.

A feature of the invention resides in a valve of the above described class comprising a fixed casing having a tapered bore to receive a correspondingly tapered plug, said casing and plug being slotted at the top to receive a pin carried on a depressible stem having a handle to operate said plug and means at the bottom of the valve for maintaining the said plug in sealed relation with its casing.

The construction is such that should the valve operating handle or pin break, or become displaced, the valve will remain in the closed sealed position, which enhances the safety feature of the device.

In the drawings:—

Figure 1:
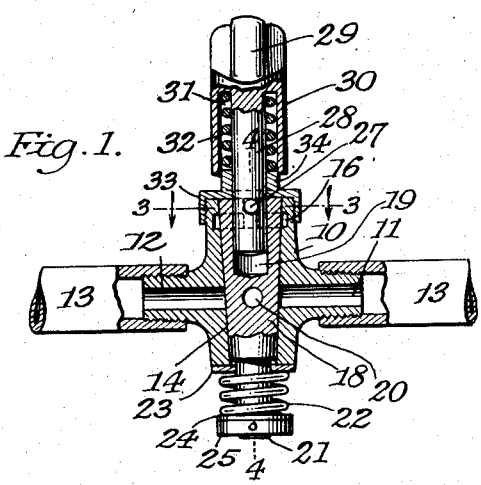
Fig. 1 is a sectional elevation of my improved safety valve with the parts in the closed position.

Referring to the drawings, the valve casing 10 is formed with an inlet and outlet nipple 11 and 12, respectively, to which are threaded sections of the line pipe 13, or couplings for connecting the valve to a gas device, like a gas range or stove.

The casing also has a central tapered bore 14 and oppositely arranged slots 15 at the top, which top portion is threaded, as shown. The slots 15 are vertically arranged and communicate with an interior circumferential groove 16, which is interrupted by a shoulder 17, to limit the turning movement of the valve to the open position.

Within the casing is a valve plug 18, counterbored at the top at 19, and provided with a cross port 20, and a reduced stem 21, around which a spring 22 is coiled and confined between washers 23 and 24, said spring and washers being secured by a nut or collar 25, threaded on or pinned to said stem 21.

The valve plug 18 has oppositely arranged vertical slots 26, coinciding with the slots 15, to receive a cross pin 27, on a depressible stem 28, slidably received in the counterbore 19, and formed integral with a handle 29, and a hood 30 spaced from the stem to provide a pocket 31, to receive a compressed spring 32, normally acting to urge the stem 28 upwardly to hold the pin 27 against a cap 33, threaded on the valve casing. This cap has a central bore for the stem 28, and a tubular boss 34, on which the spring 32 rests.

Figure 2:
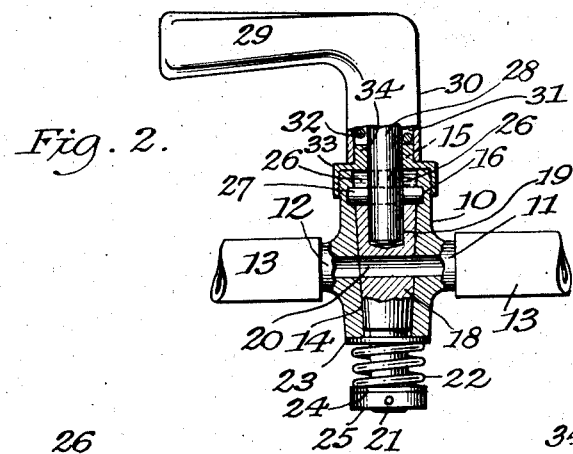
Fig. 2 is a partially sectional elevation of the valve with the parts turned to the open position to admit gas through the pipe line.
Figure 3:
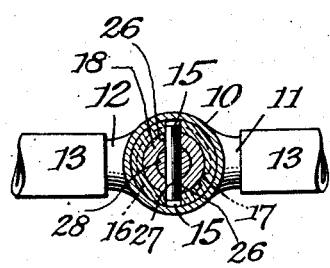
Fig. 3 is a horizontal sectional plan view taken on the line 3—3 of Fig. 1.
Figure 4:
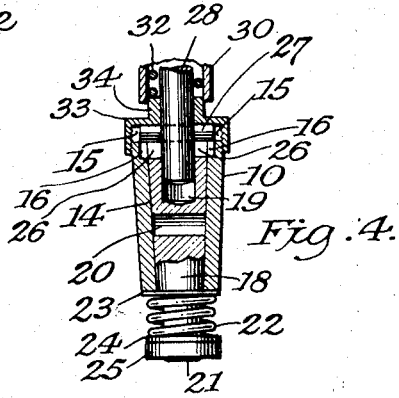
Fig. 4 is a fragmentary sectional elevation on the line 4—4 of Fig. 1.

When it is desired to turn the valve plug 18 from the closed position of Fig. 1 to the open position of Fig. 2, it is only necessary to depress the handle 29 with its stem 28, until the cross pin 27 strikes the bottoms of the slots 26 in the valve plug, at which position the ends of the cross pin will be opposite the circumferential groove 16, when the pin will be free to pass around in said groove, as the handle 29 is turned to open the service line.

Normally when the pin 27 is up against the cap 33, it ranges through the slots 26 and into the slots 15 of the casing, thereby locking the valve plug against rotary movement, as will be understood.

Changes and variations may be made in the details of construction of my invention within the spirit of the same and the scope of the appended claims.

What I claim as new, is:—

1. In a safety valve having a body with openings to a service line, a rotatable plug in the body with a transverse bore therein adapted to communicate with said openings in the body and means to permit the rotation of said plug but to keep the same in fixed relative position laterally to the service line; a slidable stem with a handle thereon said stem being secured in an axial bore in the plug, a cross pin through said stem slidable therewith in a slot in said plug and adapted to be rotated in a groove in the body when in registering relation therewith, said groove having two diametrically opposed slots in the body communicating therewith and adapted to receive the ends of said pin, their position being such that the transverse bore in the plug will be out of alignment with the openings in the body when the pin is in said slots in the body; a resilient element interposed between a shoulder on said stem and the body of the valve to normally move said pins into said slots in the body and prevent the rotation of the plug.

2. In a safety valve as set forth in claim 1, a stop in said circular groove in the body to limit the rotation of the plug when its transverse bore is in alignment with the service openings.

3. In a safety valve as set forth in claim 1, means for securing said plug in said body, said means including a cap threaded on the body and engaging the plug, and said resilient element being placed between said shoulder on the stem and said cap.

4. In a safety valve as set forth in claim 1, means for securing said plug in said body, said means including a cap threaded on the body and engaging the plug; a spaced apart sleeve concentric and integral with said stem and slidable on a portion of said cap, said resilient element being in the form of a helical spring placed between said shoulder on the stem and said cap, within said sleeve.

5. In a safety valve having a body with openings to a service line and a rotatable plug therein with a transverse bore adapted to register with said openings; a slidable axial stem in said plug with a cross pin operating in slots in said plug permitting the sliding of the stem relative to the plug, but permanently connecting said stem and said plug for rotary motion; said body having a circular groove for receiving the ends of said cross pin to permit the rotation of the plug into and out of registering relation with the service openings, said body also having two longitudinal slots in communication with said groove adapted to receive said pins when said plug is out of registering relation with said openings; a cap on the body securing said plug therein, and a resilient element interposed between a portion of the stem and said cap.

6. In a safety valve of the class described, having an axial stem with a cross pin slidable in said plug, and a circular groove in the body to permit, and longitudinal slots communicating with said groove to prevent the rotation of the cross pins and the plug; a cap threaded on the body to fix the position of the plug; a sleeve secured to a shoulder on said stem, spaced apart from and concentric with the stem; a cylindrical extension on said cap, the lower portion of said sleeve being slidable therearound, and a helical spring around said stem within said sleeve, being interposed between said shoulder and said cylindrical extension.

Signed at New York, in the county New York, and State of New York, this 5th day of May, A. D. 1926.

EUGENE GANSFRIED.